United States Patent [19]

Mocelin

[11] 4,209,196
[45] Jun. 24, 1980

[54] SUN ROOF FOR CARS

[75] Inventor: Jean-Claude Mocelin, Geneva, Switzerland

[73] Assignee: Scalaire S.A., Panama

[21] Appl. No.: 917,581

[22] Filed: Jun. 21, 1978

[30] Foreign Application Priority Data

Jun. 22, 1977 [CH] Switzerland .......................... 7817/77
Mar. 28, 1978 [CH] Switzerland .......................... 3260/78

[51] Int. Cl.² .............................................. B60J 7/06
[52] U.S. Cl. .................................................... 296/219
[58] Field of Search ............ 296/137 C, 137 D, 137 E

[56] References Cited

U.S. PATENT DOCUMENTS

| 4,134,611 | 1/1979 | Craven | 296/137 C |
|---|---|---|---|
| 4,136,906 | 1/1979 | Ireland et al. | 296/137 C |
| 4,143,907 | 3/1979 | Ireland | 296/137 C |

FOREIGN PATENT DOCUMENTS 2263120  2/1975  France ..................................... 296/137

Primary Examiner—John J. Love
Assistant Examiner—Norman L. Stack
Attorney, Agent, or Firm—Robert E. Burns; Emmanuel J. Lobato; Bruce L. Adams

[57] ABSTRACT

A flexible sun roof for cars, comprising a frame movable fowardly and rearwardly in a rectangular roof opening in the car, a flexible cover connected at one end to the frame and at its other end to the rear edge of the opening. The cover is stretched in its closed position over the opening and folded rearwardly in the open position. A device for driving the frame forwardly or rearwardly for engaging it against the front edge of the said opening, and for blocking it at least in said forward position is provided. The device has a support on which the frame is mounted. The frame is displaceable rearwardly to a limited extent with respect to the support against the action of a spring, limiting upward movement of the frame relative to the support, and a mechanism which lowers, when the support is initially displaced forwards against the action of said spring means, the frame and engages it against the front edge of the roof opening and, upon being displaced rearwardly, detaches and raises the frame under the action of the spring.

15 Claims, 12 Drawing Figures

SUN ROOF FOR CARS

BACKGROUND OF THE INVENTION

Flexible sun roof are known which comprise a frame designed to be displaced from front rearwards and vice versa in a rectangular opening in the roof, a flexible cover having one edge attached to the frame and the other edge, on its opposite side, fixed to the rear border of the said opening, the cover being designed to be stretched across the opening when the sun roof is in its closed position, and to be folded backwards in the open position of the sun roof, a device for moving the frame frontwards or rearwards and for applying it against the front border of the said opening and at least for blocking it in that position.

In the sun roofs of this type, the translatory and blocking movements are obtained by transforming distinct movements, e.g. in manually controlled sun roofs, by means of a handle which is pulled to bring the frame to its closed position and is rotated for effecting fastening and locking movements.

SUMMARY OF THE INVENTION

An object of the invention is to provide a flexible sun roof of the above-described type in which the translatory and blocking movements of the frame are effected without transition by transforming a single movement, e.g. the motion of rotation of a drive shaft, a crank shaft, etc.

BRIEF DESCRIPTION OF THE DRAWINGS

The accompanying drawings diagrammatically illustrate by way of example two embodiments of the subject matter of the invention.

DESCRIPTION OF THE PREFERRED EMBODIMENTS

Figure 1:
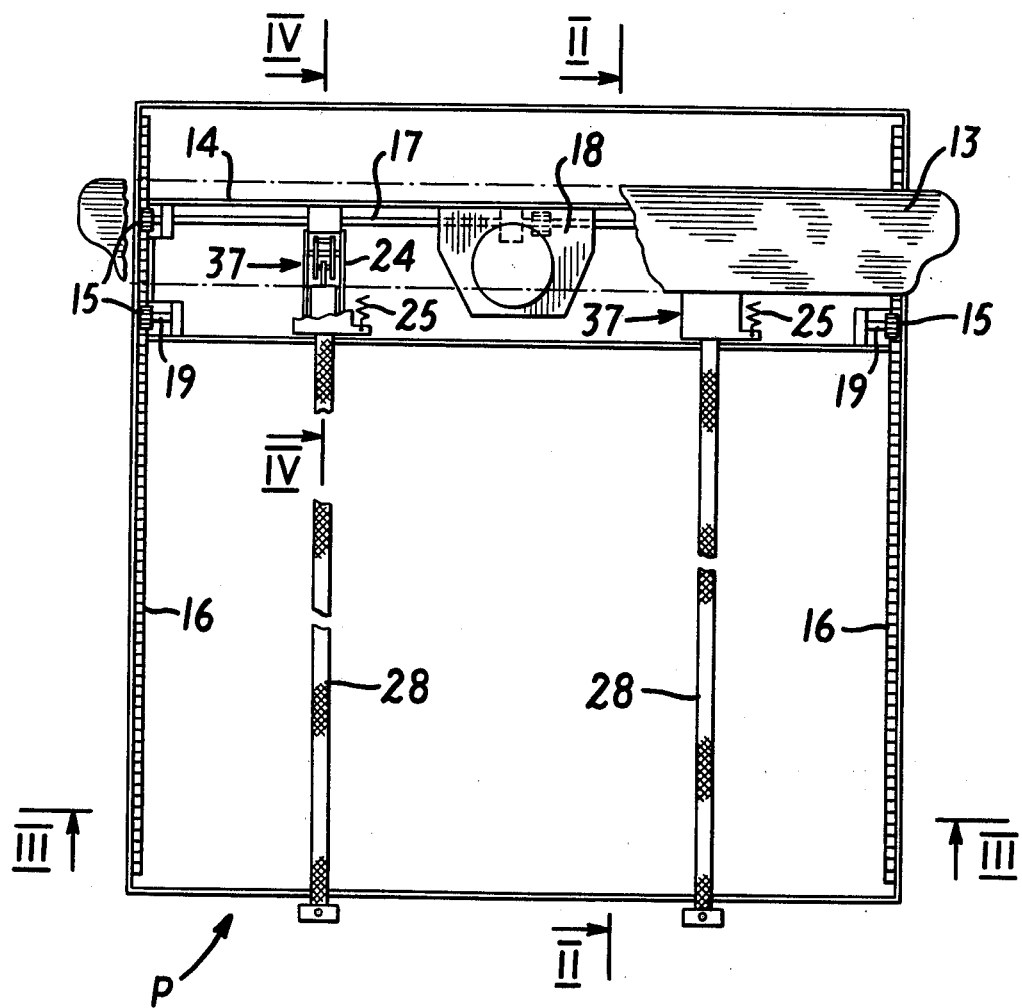
FIG. 1 is a plan view of a first embodiment in which the cover has been removed and partially broken away.

The flexible sun roof shown in FIGS. 1 to 6, which is designed to cover a rectangular opening in the roof P of a car, comprises a flexible water-proof cover 10 which extends over the edges of the opening, is supported by arches 11 and is connected, on the one hand, to a fixed frame 12 covering the rear edge of the opening in the roof and, on the other hand, to a mobile frame 13.

The mobile frame 13 is mounted on a transverse support 14 which is displaceable backward and forward to effect a translatory movement by the interposition of four pinions 15 meshing with two racks 16 fixed along the two longitudinal edges of the roof opening.

Two pinions 15 are fixed to the ends of a shaft 17 which can be rotated by an electric motor-reduction gear unit 18 arranged in the support 14, the other two pinions being fixed to two idle shafts 19.

Depending on the direction of rotation of the rotor of the motor 18 which is supplied with direct current by the battery of the vehicle, by way of a three-positions switch arranged at the dashboard, the support 14 moves backwards or forwards while entraining with it the cover 10 which is thus folded or unfolded.

The connection between the frame 13 and the support 14 comprises, on the one hand, two brackets 20 whose horizontal arms 21 are fixed to the frame 13 and, on the other hand, springs 25. The brackets 20 are articulated to two shafts 22 engaged in elongate openings 23 in side plates 24 welded to the body of the support 14, and the springs 25 are tensioned between strips 26 and 27 secured to the frame 13 and the support 14, respectively. The frame 13 and the support 14 may thus effect a relative movement in the direction of the translatory movement with amplitude equal to the length a of the openings 23 under the action or against the action of the springs 25 along the direction of displacement.

Figure 4:
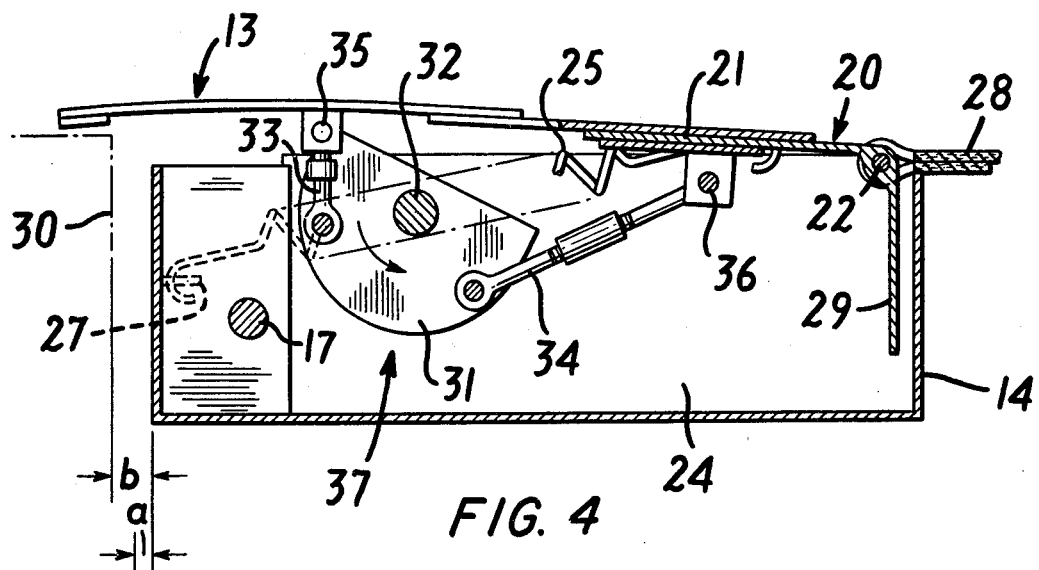
FIG. 4 is a cross-sectional view, on an enlarged scale, taken along the section line IV—IV of FIG. 1.
Figure 6:
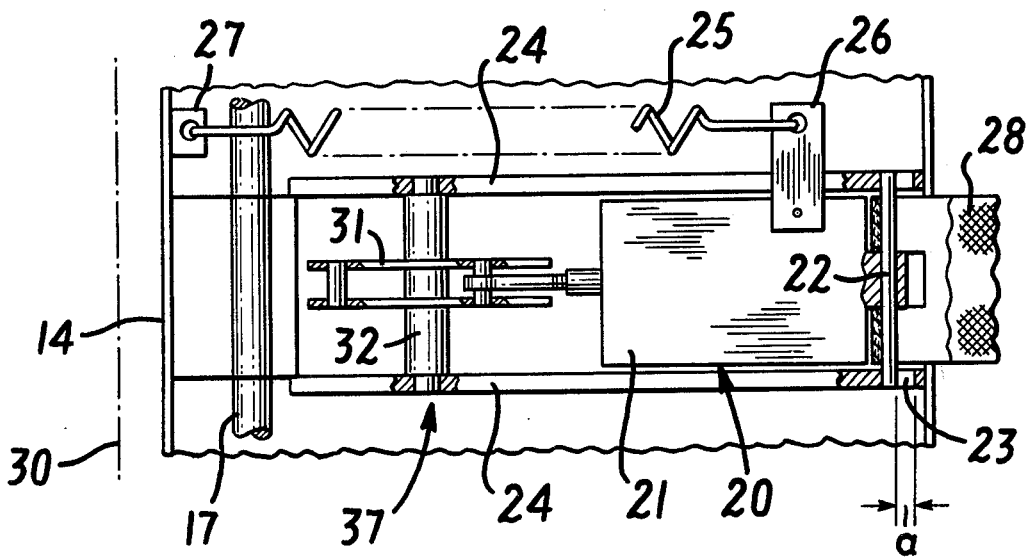
FIG. 6 is a plan view with parts broken away, corresponding to FIG. 4.
Figure 7:
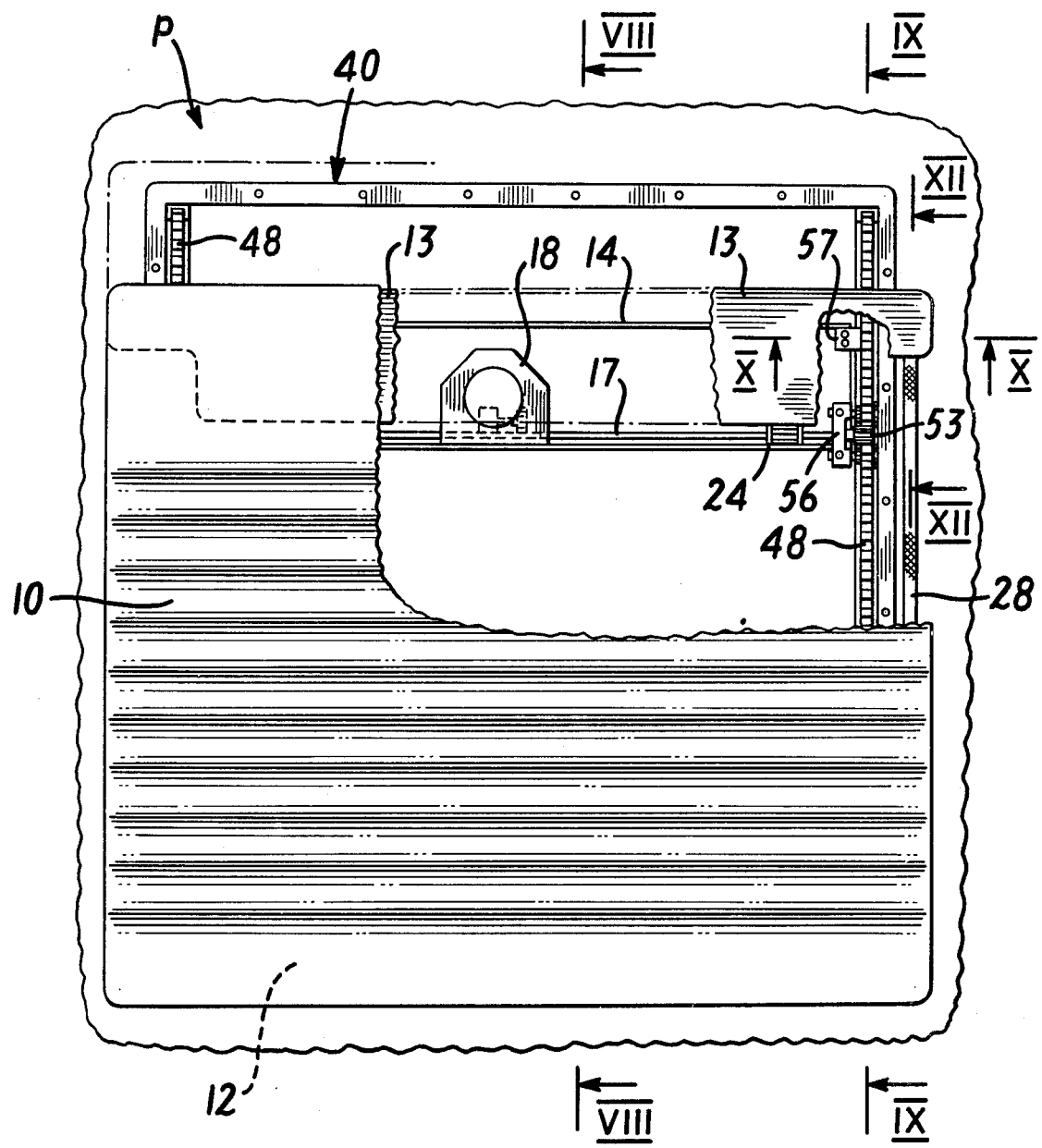
FIG. 7 is a plan view of a second embodiment in which the cover and the frame are partly broken away.
Figure 12:
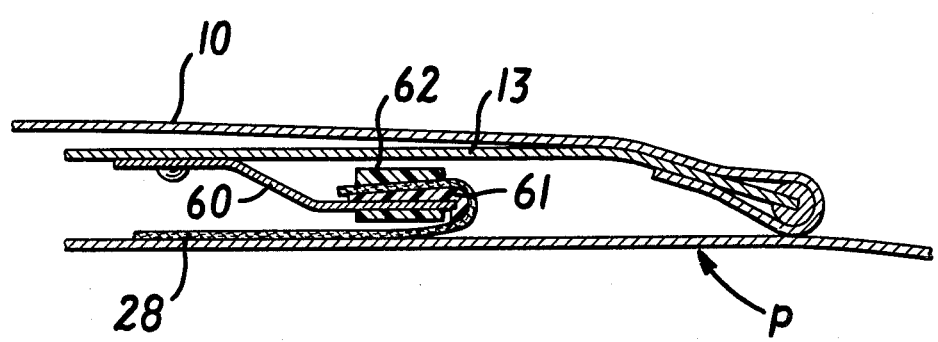
FIGS. 8 to 12 are cross-sectional views showing details and taken along the section lines VIII—VIII, IX—IX, X—X, XI—XI, and XII—XII of FIG. 7.
Figure 8:
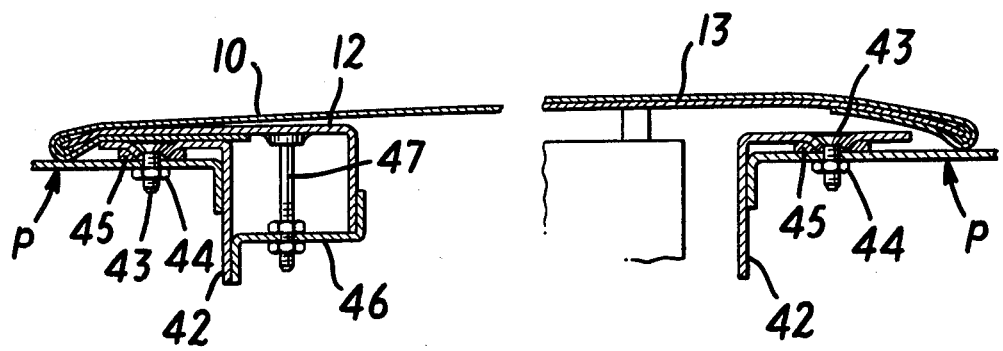
Figure 9:
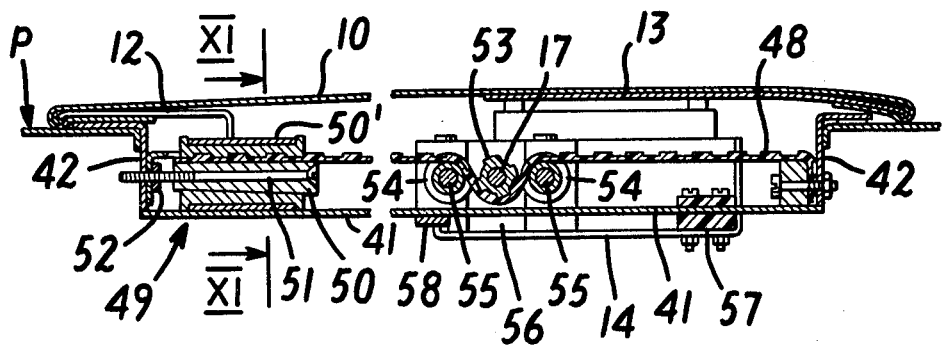
Figure 11:
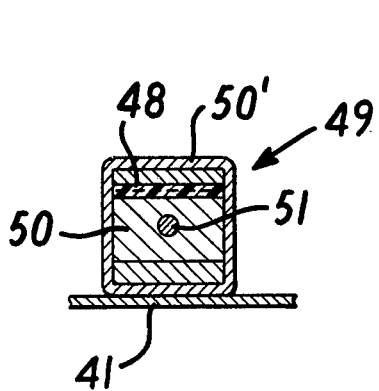
Figure 10:
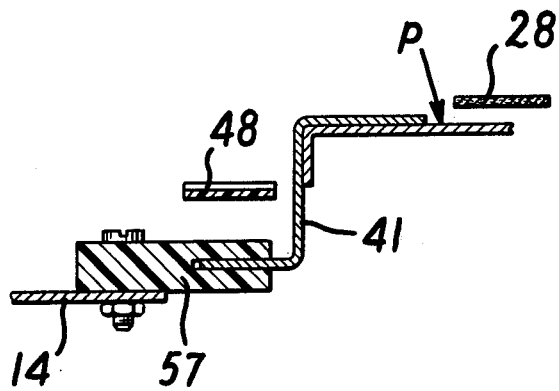

Under the action of the springs 25, the frame 13 and the support 14 occupy the relative position in which they are illustrated in FIGS. 4 and 6. It will be noted that the vertical arms 29 of the brackets 20 are thus at a distance greater than a from the rear wall of the support 14.

The roof also comprises two straps 28 which extend underneath the cover 10 and are attached to the shafts 22 and the rear edge of the roof opening, respectively. These straps have a length such that they are stretched at the moment at which the support is at a distance a from the end of its stroke, the part in sight of the frame 13 reaching then the front edge of the roof opening.

In these conditions, the shafts 22 are stopped upon closing the roof before the support 14 which runs the distance a against the action of the springs 25.

Figure 5:
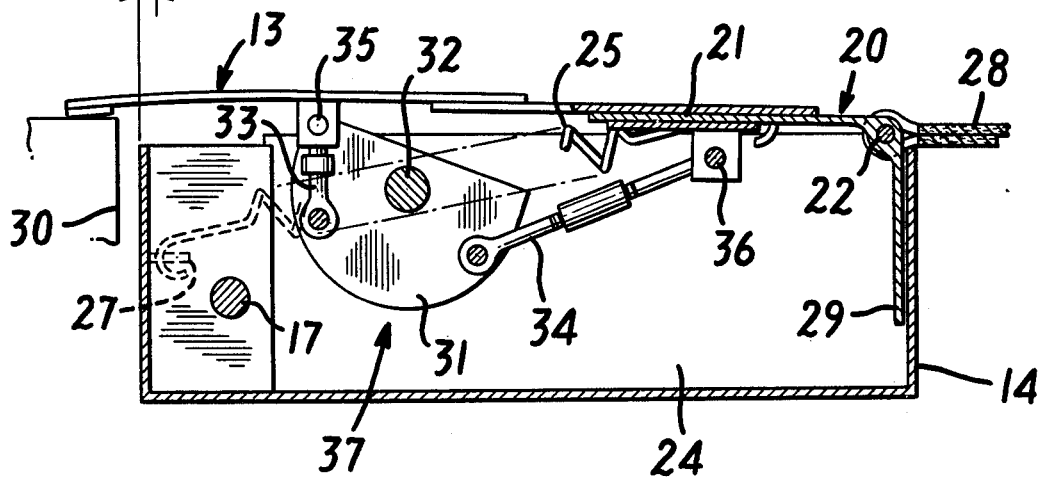
FIG. 5 is a view similar to FIG. 4 illustrating the operation of the mechanism for blocking the frame.

During this displacement of the support 14, two mechanisms 37 arranged between the side plates 24 and jointly acting cause the brackets 20 to pivot about the shafts 22 in counterclockwise direction, which results in the frame 13 being lowered and blocked against the edge 30 (FIG. 5).

Each mechanism 37 comprises (FIGS. 4 to 6) a rocker 31 whose pivot pin 32 rotates in the side plates 24 by means of two connecting rods 33 and 34 adjustable in length and articulated, on the one hand, to the rocker 31 and, on the other hand, to two shafts 35 and 36 of the frame 13 and the arm 21 of their respective bracket 20.

Starting from the instant at which the shafts 22 are stopped by the straps 28, the displacement of the support 14 has the effect of causing the rockers 31 to pivot, of loading the springs 25, and of lowering and blocking the frame 13 against the edge 30.

During the reverse displacement, the rockers 31 pivot under the action of the springs 25 to reach the position they occupy in FIG. 4, thereby raising the frame 13.

The drive of the motor-reduction gear 18 is irreversible, and thus, upon stopping, it locks the support 14 independently of its position, in particular its blocking position.

It will be noted that the two movements, i.e. translation and blocking, as well as locking of the frame 13 are caused by a single motor 18.

It will also be noted that any force exerted in the opposite direction on the frame 13 assists the blocking effect and improves tightness.

Another advantage of the above described roof is that it is self-adjusting in the sense that, during assembly, it is unnecessary to take into account possible small differences in length of the straps 28 (such differences being due to construction tolerances, or other factors such as storage time length, humidity, temperature, etc.), since a margin b makes it possible to compensate for them. This margin makes also possible to take up elongation of the straps 28 caused by wear without negatively affecting the operation of the mechanism and the tightness of the roof.

Finally, it should be noted that incorporation of the motor 18 in the support 14 constitutes an important advantage with respect to flexible sun roofs in which the frame is caused to translate by a fixed motor by way of delicate drive means which are exposed to agents such as dusts, rain, etc. which may put them out of operation very rapidly.

The flexible sun roof illustrated in FIGS. 7 to 12 comprises, as in the above-described embodiment, a flexible cover 10 which is attached, on the one hand, to a rear fixed frame 12 and, on the other hand, to a front frame 13 mounted on a support 14 which can be displaced backwards or forwards by means of a drive shaft 17 of a motor-reduction gear 18.

In this embodiment, the straps 28 (only one being shown in the drawings) are disposed laterally outside the roof opening and no longer at a given distance from the edge of this opening. The straps are arranged in borders formed in the longitudinal edges of the cover 10 and are fixed to two frames as described in greater detail below. A part from this differences in the arrangement of the straps 28 and the fact that the motor-reduction gear 18 is located at the rear zone of the support 14, the device designed to lower the frame 13 and to apply it against the front edge of the roof opening, upon closing the roof, and to detach and raise it upon opening the roof, this embodiment is similar to the previously described one. Thus, it has not been illustrated in detail in the drawings.

Figure 2:
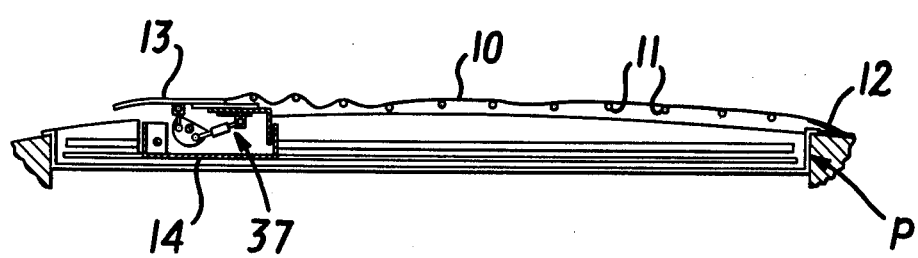
FIGS. 2 and 3 are cross-sectional views along lines II—II and III—III of FIG. 1.
Figure 3:
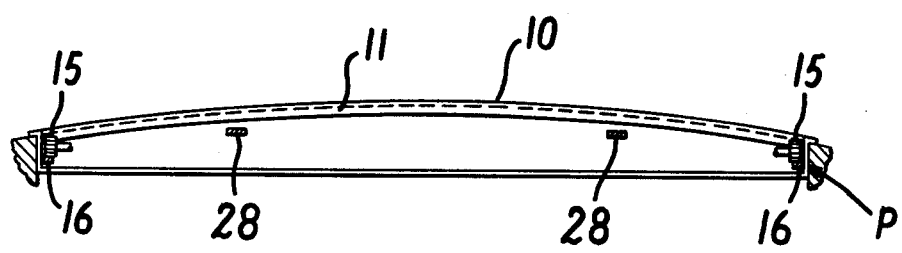

We have shown instead details of the frame 40 of the roof which are not illustrated in FIGS. 1 to 3, because such a roof has been specially designed with new driving means for the support 14.

The frame 40, which is inserted in the roof opening, comprises two longitudinal Z-shaped sections 41 and two transverse angled sections 42. The upper wings of these sections cover the four edges of the roof opening to which they are fixed by means of screws 43, nuts 44 and washers 45.

The rear frame 12 rests on brackets 46 internally welded to the vertical wing of a respective section 42. The frame 12 is fixed to the brackets by means of bolts 47. The clamping action is such that the slightly folded over edge of the frame is resiliently applied with a certain amount of pressure against a respective edge of the roof opening to ensure perfect tightness along this edge.

The drive means of the support 14 comprises (FIGS. 7 and 9) two flexible notched belts 48 extending above and along the lower wings of the sections 41. These belts are fixed at their two ends to the respective sections 42, at the back by means of a tensioning device 49.

Each device 49 comprises (FIGS. 9 and 11) a wedge 50 inserted in a square tubular body 50, a corresponding end of the belt 48 being clamped therebetween, and a screw 51 passing axially through the wedge 50 and engaging a nut 52 welded to the vertical wing of the section 42. The body 60 can be axially displaced but is prevented from rotating so that by screwing or unscrewing the screw 51 the belt 48 is tensioned to a larger or smaller extent.

The belts 48 engage two respective pinions 53 keyed on a respective end of the drive shaft 17 and turn round two turn-around rollers 54 arranged on opposite sides of each oinion 53 so as to distribute the load transmitted to them to several teeth of the pinion 53.

The rollers 54 freely rotate on shafts 55 blocked in holes drilled in the bearings 56 of shaft 17.

When the shaft 17 is rotated by the motor 18, the support 14 is displaced forwards or backwards depending on the direction of rotation. During this movement, the support 14 is guided by two slide blocks 57 made of nylon, one on each side, the blocks 57 sliding along the lower wings of the section 41. Moreover, the blocks 57 rest and slide on two plates also consisting of nylon.

The belts 48 consist of an optionally-reinforced plastics material having a high strength, good dimensional stability, and maximum tensile strength, because in their locking position the belts are subjected to relatively high stress.

The straps 28 are fixed to the frames 12 and 13 by means of spring means (FIG. 12) each comprising a spring blade 60 which is riveted at one of its ends to the frame, a plastics wedge 61, and an internally conical sleeve 62. The end of the strap is wound about the wedge 61 and the sleeve 62 is force-engaged on the assembly.

Under the action of the strap tension, such a system becomes self-blocking. Moreover, during the blocking movement of the frame 13, the blades 60 bend and resilinet deformation forces tightly apply the straps 28, and thus the longitudinal edges of the cover, against respective edges of the roof opening which is thus automatically compensated for and inevitable elongation of the strap owing to its texture is partially or totally absorbed.

The main advantages of this second embodiment, which are due in particular to the use of toothed belts and pinions, are as follows:
(a) substantial decrease in the depth of the frame under the roof sheet,
(b) elimination of the section support for the rack, and thus simplification of the frame,
(c) simple solution of the problem due to the longitudinal deflection of the roof sheet in the case of a conventional rack,
(d) elimination of corrosion problems due to dielectric phenomena or to humidity arising when using a metal rack,
(e) Dumping of vibrations caused by the motor-reduction gear, and thus perfect soundproofing,
(f) elimination of maintenance problems after selling.

Of course, the invention is not limited to the two above-described and illustrated embodiments. In particular, a modification can be made which consists in substituting a manual control for the motorized control, the manual control having the same cinematics but the support is caused to displace for example by a cranck and locking is obtained by a tangent-screw gear arranged between the crank and the shaft 17.

Moreover, the mechanisms designed to lower and rise the frame 13 could comprise a cable systems instead of connecting rods 33 and 34.

Furthermore, the connection between the frame 13 and the support 14 could be obtained by elements defining a deformable parallelogram instead of brackets 20.

Finally, the toothed belts 48 have not necessarily to pass around the rollers 54 located before and after the driving pinions 53. Other solutions could be devised to ensure a good distribution of the load transmitted by the pinions 53 to the support 14.

Furthermore, use will be made of a motor-reduction gear 18 of the type in which power supply is automatically cut off by an incorporated thermal switch when the frame 13 is at the end of its stroke.

I claim:

1. A flexible sun roof for cars, comprising, a frame movable forwardly and rearwardly in a rectangular roof opening in the car, a flexible cover connected at one end to the frame and at its other end to the rear edge of said opening, the cover being stretched in its closed position over said opening and folded rearwardly in the open position, a device for driving said frame forwardly or rearwardly for engaging it against the front edge of said opening, and for blocking it at least in said forward position, said device comprising a support on which said frame is mounted, the frame being displaceable, rearwardly to a limited extent with respect to the support against the action of spring means, for limiting upward movement of the frame relative to the support, said spring means, and a mechanism which lowers, when the support is initially displaced forwards against the action of said spring means, the frame and engages it against the front edge of the roof opening and, upon being displaced rearwardly detaches and raises the frame under action of the said spring means.

2. A sun roof as claimed in claim 1, wherein the frame is articulated to the support by means of a shaft which effects against the action of said spring means and in the direction of movement, limited-amplitide displacement with respect to the support, and said shaft.

3. A sun roof as claimed in claim 1, a deformable parallelogram mounting said frame on the support effective to make it possible to effect combined vertical and horizontal limited displacements either with, or against, the action of said spring means.

4. A sun roof as claimed in claim 1, wherein said mechanism comprises a rocker whose axis is mounted on the support and at least one connecting rod connected at one end to the rocker and, at the other end to the frame.

5. A sun roof as claimed in claim 1, wherein said mechanism comprises a cable system connected to the support and to the frame.

6. A sun roof as claimed in claim 1, wherein said device comprises a single electric motor-reduction gear mounted on the support.

7. A sun roof as claimed in claim 6, wherein said motor-reduction gear is functionally irreversible and automatically locks the support when not in operation.

8. A sun roof as claimed in claim 1, wherein the drive device for the support comprises at least one flexible toothed belt stretched between the rear and front edges of the roof opening and a toothed pinion fixed to the drive shaft mounted on the support and meshing with the toothed belt.

9. A sun roof as claimed in claim 8, including a frame inserted and fixed in the roof opening and having sides to which said belt is attached.

10. A sun roof as claimed in claim 9, wherein means are provided for adjusting the tension of the toothed belts.

11. A sun roof as claimed in claim 8, wherein said drive device comprises a roller mounted on the support, roller means about which the toothed belt passes around and maintained in meshing engagement with said toothed pinion.

12. A sun roof as claimed in claim 11, wherein said drive device comprises two rollers located on each side of the toothed pinion.

13. A sun roof as claimed in claim 1, wherein the means for limiting the movement of the frame comprises at least one strap connected to the frame and to the rear edge of the roof opening.

14. A sun roof as claimed in claim 13, wherein means comprise two straps extending along and above the longitudinal edges of the roof opening.

15. A sun roof as claimed in claim 14, wherein said straps are fixed to the frame by means of a spring device.

* * * * *